US008700766B2

(12) United States Patent
Rowe

(10) Patent No.: US 8,700,766 B2
(45) Date of Patent: Apr. 15, 2014

(54) SYSTEM AND METHOD FOR INDIRECTLY CLASSIFYING A COMPUTER BASED ON USAGE

(75) Inventor: Simon Michael Rowe, Finchampstead (GB)

(73) Assignee: Google Inc., Mountain View, CA (US)

( * ) Notice: Subject to any disclaimer, the term of this patent is extended or adjusted under 35 U.S.C. 154(b) by 111 days.

(21) Appl. No.: 13/231,805

(22) Filed: Sep. 13, 2011

(65) Prior Publication Data

US 2013/0067070 A1 Mar. 14, 2013

(51) Int. Cl.
*G06F 15/173* (2006.01)
(52) U.S. Cl.
USPC .......................... 709/224; 707/722; 707/748
(58) Field of Classification Search
None
See application file for complete search history.

(56) References Cited

U.S. PATENT DOCUMENTS

| 2002/0138331 | A1 | 9/2002 | Hosea et al. | |
|---|---|---|---|---|
| 2002/0198939 | A1* | 12/2002 | Lee et al. | 709/203 |
| 2005/0203952 | A1 | 9/2005 | Deily et al. | |
| 2008/0010307 | A1 | 1/2008 | Doliov | |
| 2009/0138593 | A1* | 5/2009 | Kalavade | 709/224 |
| 2010/0192069 | A1 | 7/2010 | Toebes et al. | |
| 2011/0016129 | A1 | 1/2011 | Sheymov | |
| 2012/0102169 | A1* | 4/2012 | Yu et al. | 709/223 |

OTHER PUBLICATIONS

Google Inc., International Search Report/Written Opinion, PCT/US2012/054262, Feb. 19, 2013, 9 pgs.

* cited by examiner

*Primary Examiner* — Moustafa M Meky
*Assistant Examiner* — Clayton R Williams
(74) *Attorney, Agent, or Firm* — Morgan, Lewis & Bockius LLP

(57) ABSTRACT

A server computer receives web request events corresponding to web requests issued by users. Each web request event includes: a cookie that identifies the user computer that originated the corresponding web request; an IP address corresponding to the user computer; and a date/time stamp indicating when the corresponding web request was received at a web server. The server stores the web request events. The server selects a subset of the web request events, all of which are associated with the same cookie. Then the server computes a geographical location corresponding to the user computer, where the computation uses the IP address associated with the web request event. The server determines the local time and day of week corresponding to the web request. The server then classifies the user computer based, at least in part, on a usage pattern corresponding to the web request events in the subset.

25 Claims, 10 Drawing Sheets

Research Panel Form 500

Research Panel

Please answer the following 3 questions

Question #3 of 3

Do you remember seeing this ad while watching TV at home?
○ Yes
○ No

« Previous | Submit Survey

Figure 5

Survey Panel Ad Approval Form 600

Survey Panel Ad Approval Tool

For each ad to review, update the status column and enter a change note. When finished, click "Save" to save your changes.

602

Save

| Ad ID | Status | Last Status Change | Change Notes |
|---|---|---|---|
| | | Show Status: Approved (All Ages) ⬦ | search |
| | | | 610 |
| GOOG00025X7 | Approved (All Ages) ⬦ | Approved (All Ages) 612<br>John T. Reviewer 614<br>Sep 30, 2010 11:14:13 PM<br>[No reason given] | 616 |
| 606 | 608 | | 618 |
| GOOG00026W9 | Approved (All Ages) ⬦ | Approved (All Ages)<br>John T. Reviewer<br>Sep 30, 2010 11:04:16 PM<br>[No reason given] | |

Media

Problem History and Approval Form 700

Panelist Reported Problem History — 710

| Date | Problems reported | Comments |
|---|---|---|
| Aug 13, 2010 3:49:21 AM | Other | Question #2 is the same as Question #1 |

714 — 712 — 716 — 718 — 720 — 722

Ad Approval Information — 724
Ad ID: GOOG0022TT    Approved (All Ages) — 728

Last Approval Status Change — 730
[Approved (All Ages) ▾]  [Update] — 740

| Date | Status | Reason Changed by |
|---|---|---|
| Aug 9, 2010 6:44:33 PM | Approved (All Ages) | John T. Reviewer |

732 — 734 — 736 — 738 — 742 — 744 — 746 — 726

702 Question #2 of 3

704 Ad ID: GOOG0022TT
706 Do you remember seeing this ad while watching TV at home?
  ○ Yes
  ○ No
708

SYSTEM AND METHOD FOR INDIRECTLY CLASSIFYING A COMPUTER BASED ON USAGE

TECHNICAL FIELD

The disclosed embodiments relate generally to web browsing activity, and more specifically to classifying a user computer based on that web browsing activity.

BACKGROUND

Users access a wide variety of web sites over the Internet. In general, the web server receiving a request has little or no knowledge about the user, and thus the response must be made generically. In some instances, a user explicitly provides information, such as responding to online questions. Usage of user-provided information is subject to error, and is burdensome to users. In other instances, information about a user is collected over time based on previous activity.

However, even with some information about a user, a web server typically has little information about the user's computer.

SUMMARY OF THE INVENTION

Disclosed embodiments provide methods to classify a user's computer, and thereby enable a web server to provide better information to the user of the computer. In some embodiments, each computer is classified as a "home" computer, a "work" computer, a "mobile" computer, or a smart phone. Once this classification is made, a web server responding to a request can provide more relevant or better targeted information. For example, knowing that a computer is used at work can enable better selection of advertisements for web pages or better selection of search results responsive to a user query. This information also makes it is possible to make suggestions to users as to other content of interest. The classification of a user's computer also enables providing valuable information to advertisers, such as the viewing and Internet behaviors of different viewer segments.

In some embodiments, classification of a user's computer is implemented on a server with one or more processors and memory. The memory stores programs that are executed by the processors. The server computer system receives a plurality of web request events corresponding to web requests issued by users. Each web request event includes: (i) a cookie that identifies the user computer that originated the corresponding web request; (ii) an IP address corresponding to the user computer at the time the web request was issued; and (iii) a date/time stamp indicating when the corresponding web request was received at a web server. The server computer system stores the web request events. The server system selects a subset of the plurality of web request events. All of the web request events in the subset are associated with a single first cookie. Then, for each web request event in the subset, the server system computes a geographical location corresponding to the user computer, where the computation uses the IP address associated with the web request event. The server system determines the local time and local day of week corresponding to the web request using the stored date/time stamp of the web request event and the computed geographic location. The server system then classifies the user computer based, at least in part, on a usage pattern of the local time and local day of week data corresponding to the web request events in the subset.

BRIEF DESCRIPTION OF THE DRAWINGS

FIGS. 5 is an exemplary screen shot viewed by a panelist who participates in a research panel in accordance with some embodiments.

FIGS. 6-7 are exemplary screen shots of programs used to manage a research panel in accordance with some embodiments.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

Figure 1:
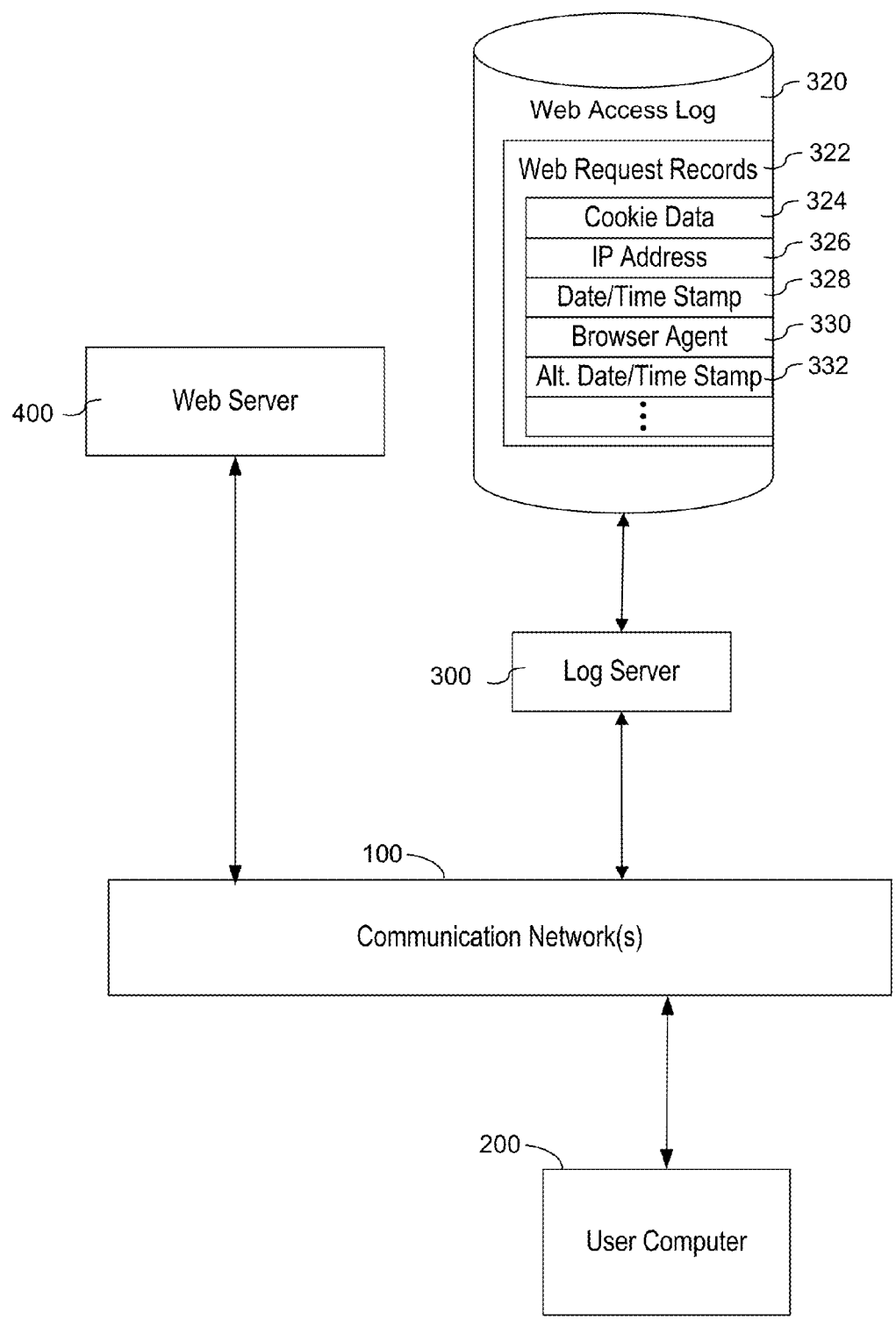
FIG. 1 is a block diagram of a system that classifies user computers in accordance with some embodiments.

Embodiments illustrated in FIG. 1 can be used to classify user computers 200. As used herein, a user computer 200 can be any electronic device that runs a web browser and has access to the Internet. For example, desktop computers, laptop computers, tablet computers, and many handheld devices such as smart phones. In some embodiments, the classifications of user computers are "home computer," "work computer," "mobile computer," and "smart phone." In some embodiments there are more or fewer classifications of computers, such as a single classification that combines "mobile computers" (e.g., laptop computers) and "smart phones." As shown, the various user computers 200, web servers 400, and log servers 300 communicate over a communications network 100, such as the Internet, local area networks, wide area networks, wireless networks, etc. A web server 400 provides responses to user requests, as described more fully below with respect to FIG. 4. A log server 300 maintains a log 320 of user web requests 322. In some embodiments, the log server 300 includes modules to perform calculations based on the information in the log 320. This is described more fully below in FIG. 3.

Figure 2:
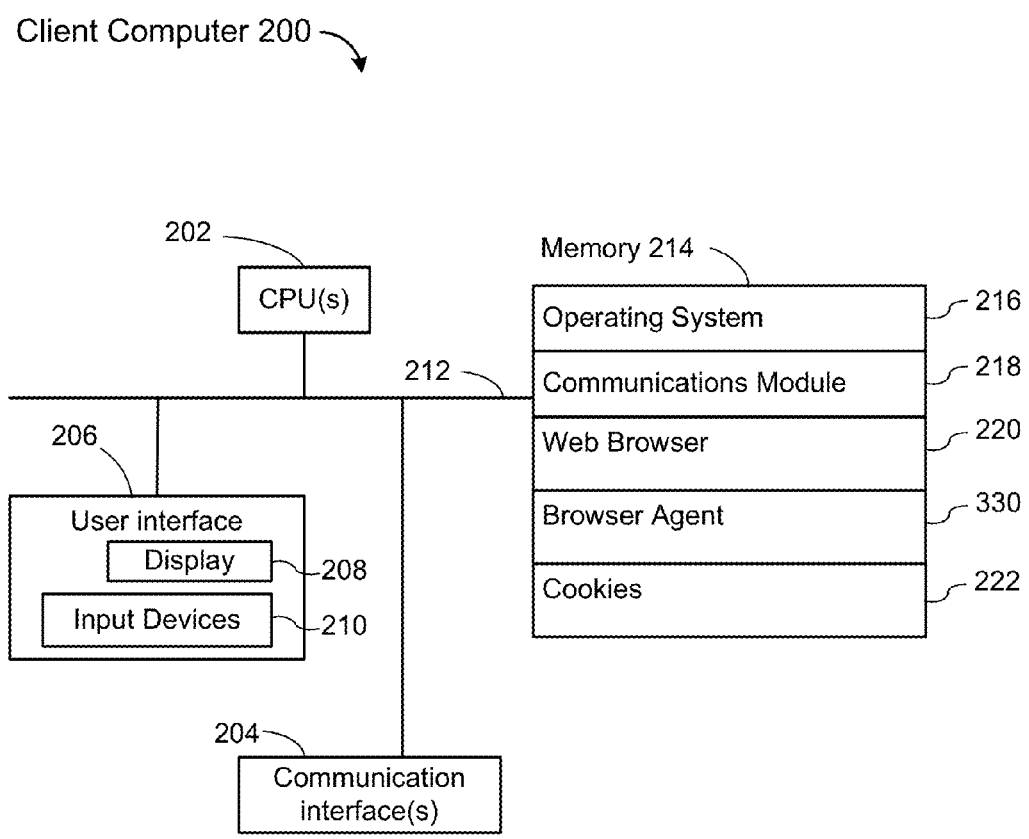
FIG. 2 is a functional block diagram of a client computer in accordance with some embodiments.

FIG. 2 illustrates a typical client computer 200. A client computer 200 generally includes one or more processing units (CPUs) 202, one or more network or other communications interfaces 204, memory 214, and one or more communication buses 212 for interconnecting these components. The communication buses 212 may include circuitry (sometimes called a chipset) that interconnects and controls communications between system components. A client computer 200 includes a user interface 206, for instance a display 208 and one or more input devices 210, such as a keyboard and a mouse. Memory 214 may include high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 214 may include mass storage that is remotely located from the central processing unit(s) 202. Memory 214, or alternately the non-volatile memory device(s) within memory 214, comprises a computer readable storage medium. In some embodiments, memory 214 or the computer readable storage medium of memory 214 stores the following programs, modules and data structures, or a subset thereof:

- an operating system 216 (e.g., WINDOWS or MAC OS X) that generally includes procedures for handling various basic system services and for performing hardware dependent tasks;
- a network communications module 218 that is used for connecting the client computer 200 to servers or other computing devices via one or more communication networks, such as the Internet, other wide area networks, local area networks, metropolitan area networks, and the like;
- a web browser 220, which allows a user of the client computer 200 to access web sites and other resources over the communication network. In some embodiments, each browser is associated with a unique browser agent 330; and
- one or more cookies 222, which provide persistent data for web sites visited by a household member 118 at the client computer 200. In some embodiments there is a special classification cookie, which uniquely identifies the computer where the cookie is stored. In some embodiments, a single classification cookie is used by multiple web pages.

Figure 3:
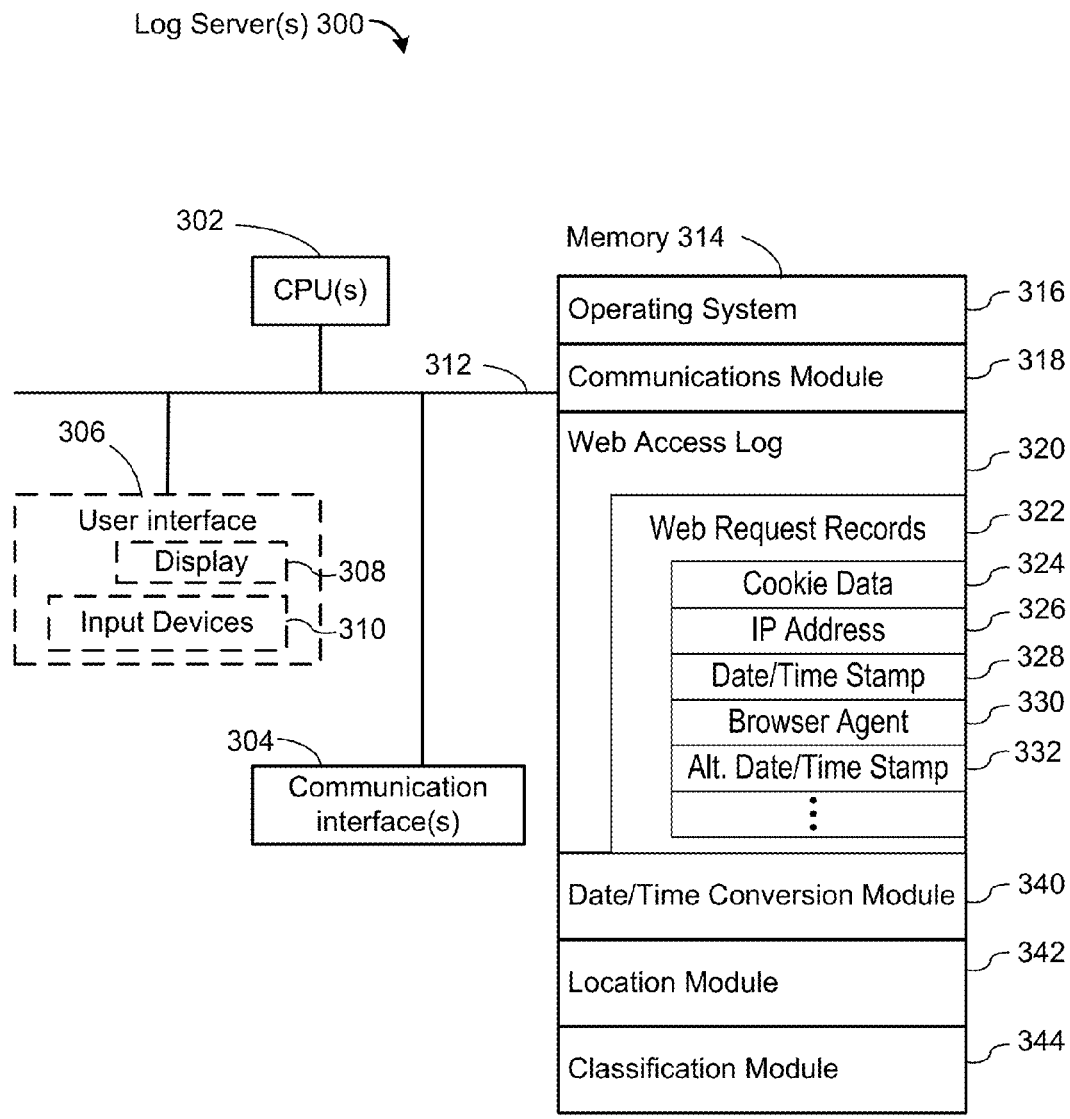
FIG. 3 is a functional block diagram of a log server in accordance with some embodiments.

Referring to FIG. 3, the log server 300 generally includes one or more processing units (CPUs) 302, one or more network or other communications interfaces 304, memory 314, and one or more communication buses 312 for interconnecting these components. The communication buses 312 may include circuitry (sometimes called a chipset) that interconnects and controls communications between system components. The log processor 300 may optionally include a user interface 306, for instance a display 308 and a keyboard 310. Memory 314 may include high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 314 may include mass storage that is remotely located from the central processing unit(s) 302. Memory 314, or alternately the non-volatile memory device(s) within memory 314, comprises a computer readable storage medium. In some embodiments, memory 314 or the computer readable storage medium of memory 314 stores the following programs, modules and data structures, or a subset thereof:

- an operating system 316 (e.g., Linux or Unix) that generally includes procedures for handling various basic system services and for performing hardware dependent tasks.
- a network communications module 318 that is used for connecting the log server 300 to servers or other computing devices via one or more communication networks, such as the Internet, other wide area networks, local area networks, metropolitan area networks, and the like.
- one or more Web Access Logs 320, which store information about online web browsing activity. The log 320 includes a collection of web request records 322. In some embodiments, each web request record includes cookie data 324, which identifies the computer that issued the web request (e.g., a MAC address); the IP address 326 of the user computer that issued the request (generally the IP address of the modem or router used by the user computer); a date/time stamp 328 that specifies when the user request was issued (generally the date/time when the web request was received at a web server 400, or the date/time when the web request information is received at the log server if web request information is forwarded quickly from the web server); and a browser agent 330, which identifies the web browser and version. In some embodiments, the web request records 322 include an alternative date/time stamp 332, which is from the user computer 200 that originated the web request. In some embodiments, more or less data is stored with each record in the web request records 322.
- a date/time conversion module 340, which translates between time zones based on the location of the user computer and the location of the web server responding to the web request or the location of the log server.
- a location module 342, which computes the geographic location of a user computer based on the IP address 326 assigned to the computer. The correlation between IP address 326 and location may use a database that correlates IP address ranges to specific geographic locations. In some embodiments, the correlation database is updated on a periodic basis as new IP address ranges are assigned or IP address ranges are relocated to different geographic locations.
- a classification module 344, which identifies a classification corresponding to a computer based on a usage pattern for the computer. In some embodiments, a computer is classified as a "home computer" if it is used primarily during non-business hours, e.g., only mornings, evenings, or on weekends. Conversely, some embodiments classify a computer as a "work computer" if it is used primarily during business hours (e.g., Monday-Friday, 8:00-5:00). In some embodiments, a computer is classified as a "smart phone" based on the browser agent. For example, the web browser may be one that is only used on a phone. In some embodiments, a computer is classified as a "mobile computer" when none of the other classifications apply. In different geographic regions, different patterns of usage may be applied. For example, standard business hours in San Francisco may be different from standard business hours in Spain.

Although FIG. 3 shows a log server, FIG. 3 is intended more as functional descriptions of the various features which may be present in a set of servers than as a structural schematic of the embodiments described herein. In practice, and as recognized by those of ordinary skill in the art, items shown separately could be combined and some items could be separated. For example, some items shown separately in FIG. 3 could be implemented on single server and single items could be implemented by one or more servers. The actual number of servers used to implement a log server, and how features are allocated among them will vary from one implementation to another, and may depend in part on the amount of data traffic that the system must handle during peak usage periods as well as during average usage periods.

Figure 4:
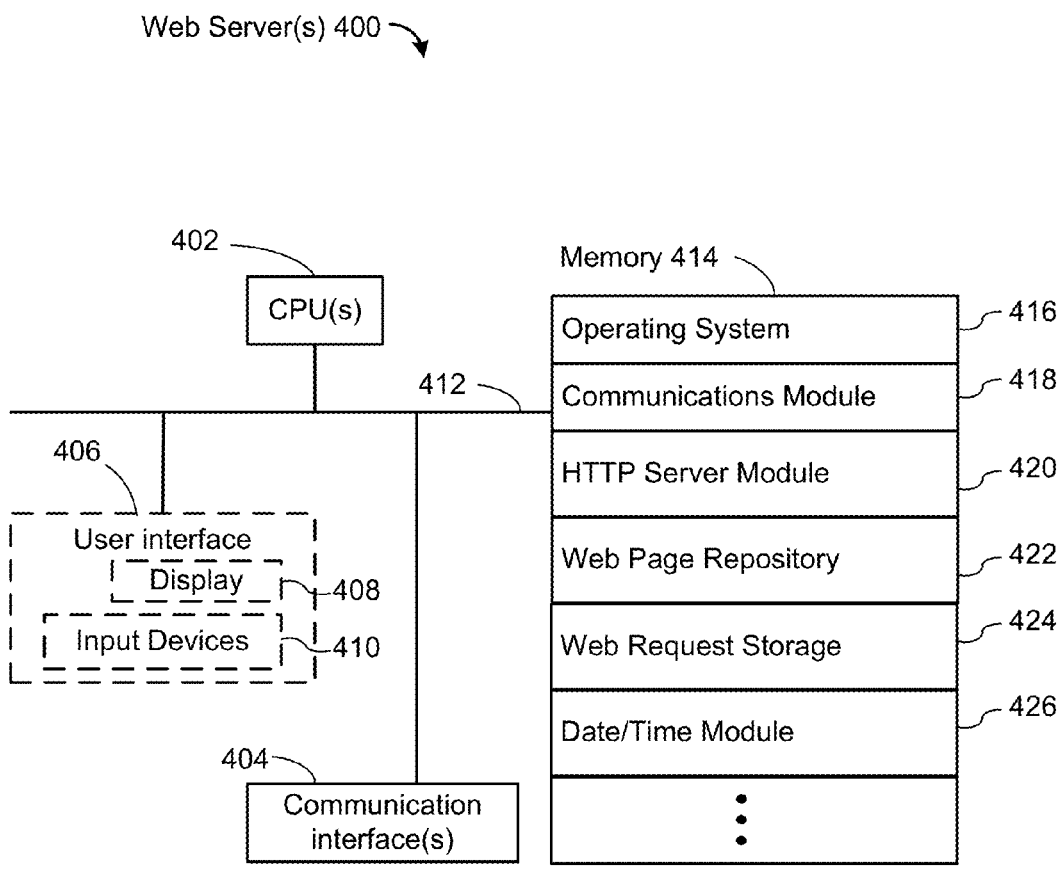
FIG. 4 is a functional block diagram of a web server in accordance with some embodiments.

Referring to FIG. 4, a web server 400 generally includes one or more processing units (CPUs) 402, one or more network or other communications interfaces 404, memory 414, and one or more communication buses 412 for interconnecting these components. The communication buses 412 may include circuitry (sometimes called a chipset) that interconnects and controls communications between system components. The web server 400 may optionally include a user interface 406, for instance a display 408 and a keyboard 410. Memory 414 may include high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 414 may include mass storage that is remotely located from the central processing unit(s) 402. Memory 414, or alternately the non-volatile memory device(s) within memory 414, comprises a computer readable storage medium. In some embodiments, memory 414 or the computer readable storage medium of memory 414 stores the following programs, modules and data structures, or a subset thereof:

- an operating system 416 (e.g., Linux or Unix) that generally includes procedures for handling various basic system services and for performing hardware dependent tasks.
- a network communications module 418 that is used for connecting the web server 400 to servers or other computing devices via one or more communication networks 100, such as the Internet, other wide area networks, local area networks, metropolitan area networks, and the like.
- an HTTP server module 420 (e.g., Apache Tomcat), which receives web requests from users and responds by providing web pages. Although many web page requests use HTTP, embodiments can use other network protocols as well, such as HTTPS or FTP.
- a web page repository 422, which includes web pages that may be requested by users. Web pages may be static, or dynamically constructed as requested. In many cases, web pages include certain fixed content and certain dynamic content that is filled in while responding to the user request.
- web request storage 424, which holds information about web requests until forwarded to a log server 300. In some embodiments, web request storage is volatile memory, because the web requests are forwarded on to the log server 300 immediately. In some embodiments, web request storage 424 is a database, and web request records 322 are accumulated for some period of time before being transmitted to a log server 300. In some embodiments, the web request records 322 stored at an individual web server are removed after transmission to a log server 300. In other embodiments, the web request records 322 are retained at the web server.
- a date/time module 426, which assigns a date/time stamp to web requests as they are received. In some embodiments, a highly stable time clock system is utilized to guarantee accuracy of the generated date/time stamps.

Although FIG. 4 shows a web server, FIG. 4 is intended more as functional descriptions of the various features which may be present in a set of servers than as a structural schematic of the embodiments described herein. In practice, and as recognized by those of ordinary skill in the art, items shown separately could be combined and some items could be separated. For example, some items shown separately in FIG. 4 could be implemented on single server and single items could be implemented by one or more servers. The actual number of servers used to implement a web server, and how features are allocated among them will vary from one implementation to another, and may depend in part on the amount of data traffic that the system must handle during peak usage periods as well as during average usage periods.

Each of the methods described herein may be performed by instructions that are stored in a computer readable storage medium and that are executed by one or more processors of one or more servers or clients. Each of the operations shown in FIGS. 1-4 may correspond to instructions stored in a computer memory or computer readable storage medium.

Although some embodiments use web servers 400 and log servers 300 as illustrated in FIG. 1, the functionality can be distributed to one or more servers in various ways. In some embodiments, all of the functionality of the log server 300 and web server 400 is implemented at a single server. In other embodiments, the functionality illustrated for log server 300 and web server 400 is allocated among three or more computer. In one such embodiment, a log server comprises just has a database engine, and the analytic operations of the Date/Time module 340, Location Module 342, and Classification Module 344 are implemented on a third server. In some embodiments, the Date/Time Module 426 is implemented on the log server, so that a Date/Time Module is not required on each individual web server. This configuration for the Date/Time Module 426 works when information about web requests is forwarded to the log server 300 quickly.

The classification of computers can also be valuable to users who agree to participate in a ratings panel. A "single source panel" is an all-in-one ratings system that measures viewership across television and the Internet.

Surveys are one way to get ratings information. For example, a sample page of an exemplary survey is depicted in FIG. 5. In a typical survey tool 500, there are three ads 504 that were actually shown on a computer, and another three ads that were not shown (used as a control group). A consumer completes the survey in 2-3 minutes, and indicates which ads were remembered. The tool 500 asks (502) questions of the panelist, and instructs (502) the panelist how to use the tool. The panelist answers (508) yes or no to each question 506. The panelist can return (510) to a previous ad, or submit (512) the survey after answering all of the questions.

In addition, for such surveys to be useful to an advertiser, the selected panelists must be within the target population (e.g., in the right demographic segment and having an appropriate viewing history and/or set of interests) and they must be willing to complete the survey tools. Conventionally, identifying appropriate panelists has required the use of lengthy screening procedures, including written and/or online questionnaires, and incentives for panelists to complete the surveys. While these approaches may be effective for small panels, they are cumbersome if used for large panels (for example, to generate surveys for those large panels). Information from large panels is especially useful because it can be aggregated and used to spot trends among large groups of users. The information can also provide helpful information for targeting ads and content for large numbers of individuals.

For example, a method implemented at a log server 300 can conduct searches on web request records 322 for individuals to generate survey tools 500 for individual panelists and identify likely panelists. For example, likely panelists can be identified based on records of click-through history for web ads, and logs of media content viewed. Once identified, the surveyor can interact with the panelists and prospective panelists through additional status and approval screens, such as the screens illustrated in FIGS. 6 and 7. Panelist feedback can also be associated with the IP address 326, and used to tailor subsequent survey tools. In some embodiments, this process can also be used to identify and place panelists or computers on a white list, indicating clearance and willingness to participate in surveys.

FIG. 6 illustrates a Survey Panel Ad Approval Tool 600, which is an interactive web form. The form 600 instructs (602) a panelist how to use the form. The form displays one or more media excerpts 604, which can be film clips, individual frames from film clips, or single images (e.g., from a web-based advertisement). Each media excerpt advertisement 604 has a corresponding Ad ID 606, and a corresponding status 608. In some embodiments, the status indicates the audience for which the panelist considers the ad to be approved (e.g., what ages, such as "all," "18+," or "21+"). In some embodiments, form 600 includes an indicator 610 of the last (most recent) status change. In some embodiments, the information on the last status change includes the name 612 of the panelist who made the change, and the date/time 614 when the change was made. Some embodiments also include change notes 616, which provides free-form space 618 for the panelist to write additional notes.

FIG. 7 illustrates a Problem History and Ad Approval tool 700, which is used in some embodiments to track both approvals as well as problems identified by panelists. In the illustrated embodiment, the form 700 displays an advertisement 702, together with the corresponding Ad ID 704, which uniquely identifies the advertisement. In some embodiments, the advertisement 702 is displayed together with a question 706 asking the panelist whether the advertisement 702 had been seen. In these embodiments, there is space 708 to answer the question, which may be implemented as a pair of yes/no radio buttons. In some embodiments, the form includes a control (not shown) to move forward or backward in the set of questions.

The form 700 includes a problem history section 710, which enables panelists to report problems with the survey questions. In the illustrated embodiment, a panelist can specify the problem category 716 and additional comments 720. In some embodiments, there is also a date field 712 for each problem. In preferred embodiments, the form automatically fills in the date 714 during entry or when saved. The panelist specifies the problem category 718 (e.g., "other" in the illustrated embodiment) and comments 722.

The ad approval section 724 in form 700 is similar to FIG. 6. Because FIG. 7 illustrates a combination problem history / ad approval form 700, there is less space available for ad approval. In the illustrated embodiment, the approval information corresponds to the one ad 702 shown on the form 700. In this embodiment, the Ad ID 726 is repeated (duplicating Ad ID 704). Some embodiments omit this repetition. The ad approval section 724 also includes the approval status 728. The approval status 728 may indicate an age range for which the panelist believes the ad is appropriate. Similar to the embodiment of FIG. 6, the ad approval section 724 includes the last approval status change 730, which typically includes the date 732, the changed status 736, the reason 740 for the change, and the name 744 of the panelist making the change. The values for these fields (date 734, status 738, reason 742, and panelist 746) may be displayed below the field labels. In preferred embodiments, the date and panelist name are filled in automatically by the form. In some embodiments, the reason 740 is optional, and thus the reason field 742 may be blank as illustrated in form 700.

Figure 8:
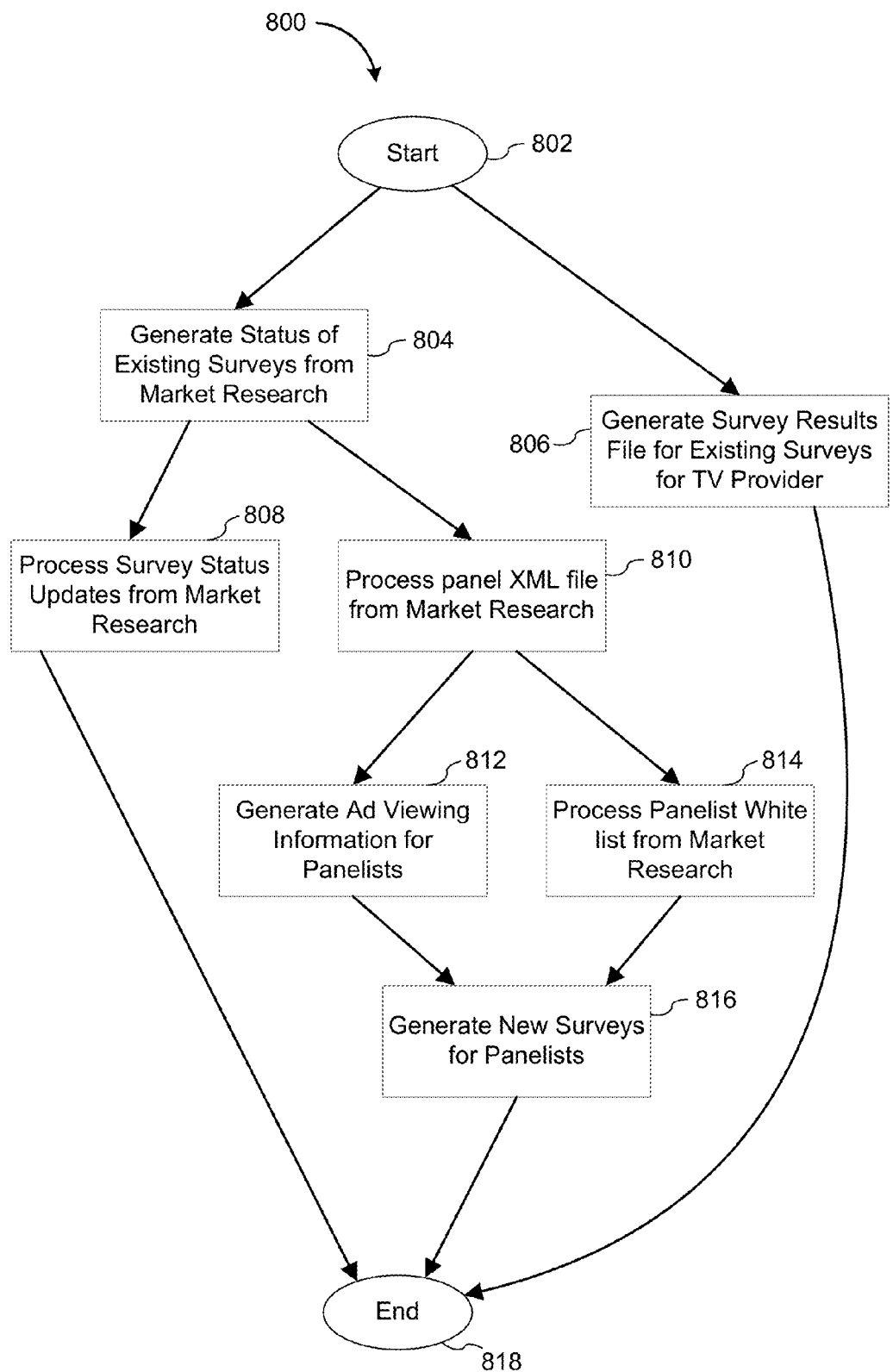
FIG. 8 illustrates a process used to generate and correlate survey information from panelists according to some embodiments.

Using the log information maintained by the log server 300, some embodiments are configured to automatically generate new surveys and otherwise monitor the progress of surveys. For example, FIG. 8 shows an exemplary process flow for a process that automatically generates survey tools. This flow employs a log file, which is an XML file in this example. The log file represents TV viewing and web usage data for one or more households to generate ad viewing information for panelists and to identify panelists for a particular survey from white list information. Using this information, the flow then generates new surveys for the white listed panelists. In other words, using the associated TV and web data, along with panelist information, such as white list information, the flow automatically generates appropriate ads for surveying each enrolled household (including already viewed ads and control ads).

When the illustrated process flow 800 in FIG. 8 starts (802), two independent operations occur. In one branch of the process flow 800, the status of existing surveys from the market research system is generated (804). In some embodiments, the generation (804) includes creating an XML file of panelists and survey results.. In addition, the process flow 800 generates (806) a survey results file for existing surveys. The survey results file may include partially completed surveys, or may be limited to surveys that are fully complete.

After the survey status is generated (804), some embodiments process (810) the created panel XML file. While processing (810) the panel XML file, the process flow 800 generates (812) ad viewing information for the panelists and processes (814) the panelist white list from the market research system. In some embodiments, the panelist white list identifies TV subscribers who meet the eligibility requirements (e.g., having appropriate hardware and software). Using the ad viewing information and the panelist white list, the process 800 generates (816) new surveys for panelists. In addition, the process flow 800 processes the survey status updates from the market research systems. The process flow 800 ends (818) when the survey status updates are processed (808), the new surveys for panelists are generated (816), and the survey results for existing surveys are generated (806).

Figure 9A:
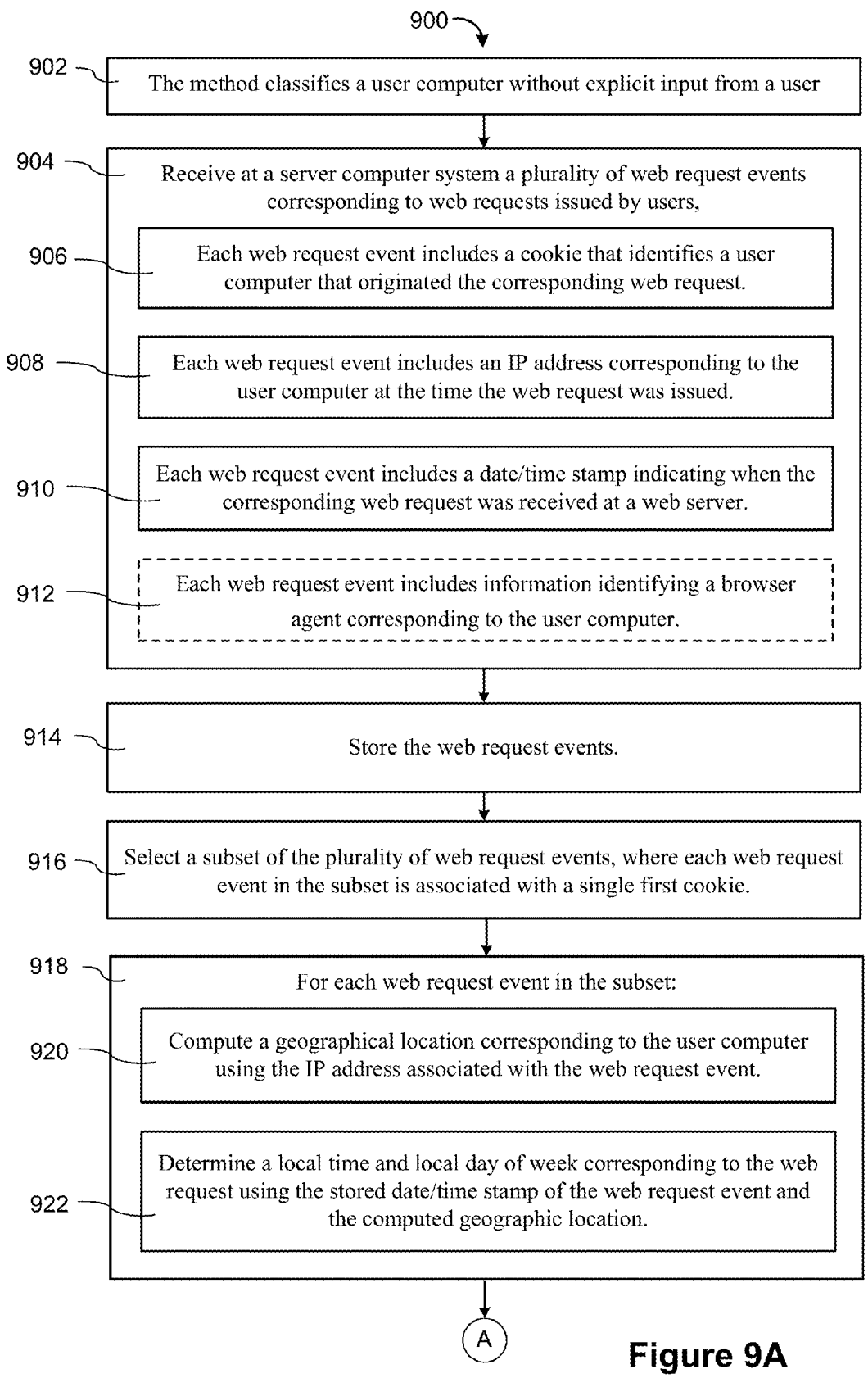
FIGS. 9A-B illustrates an exemplary process flow according to some embodiments.
Figure 9B:
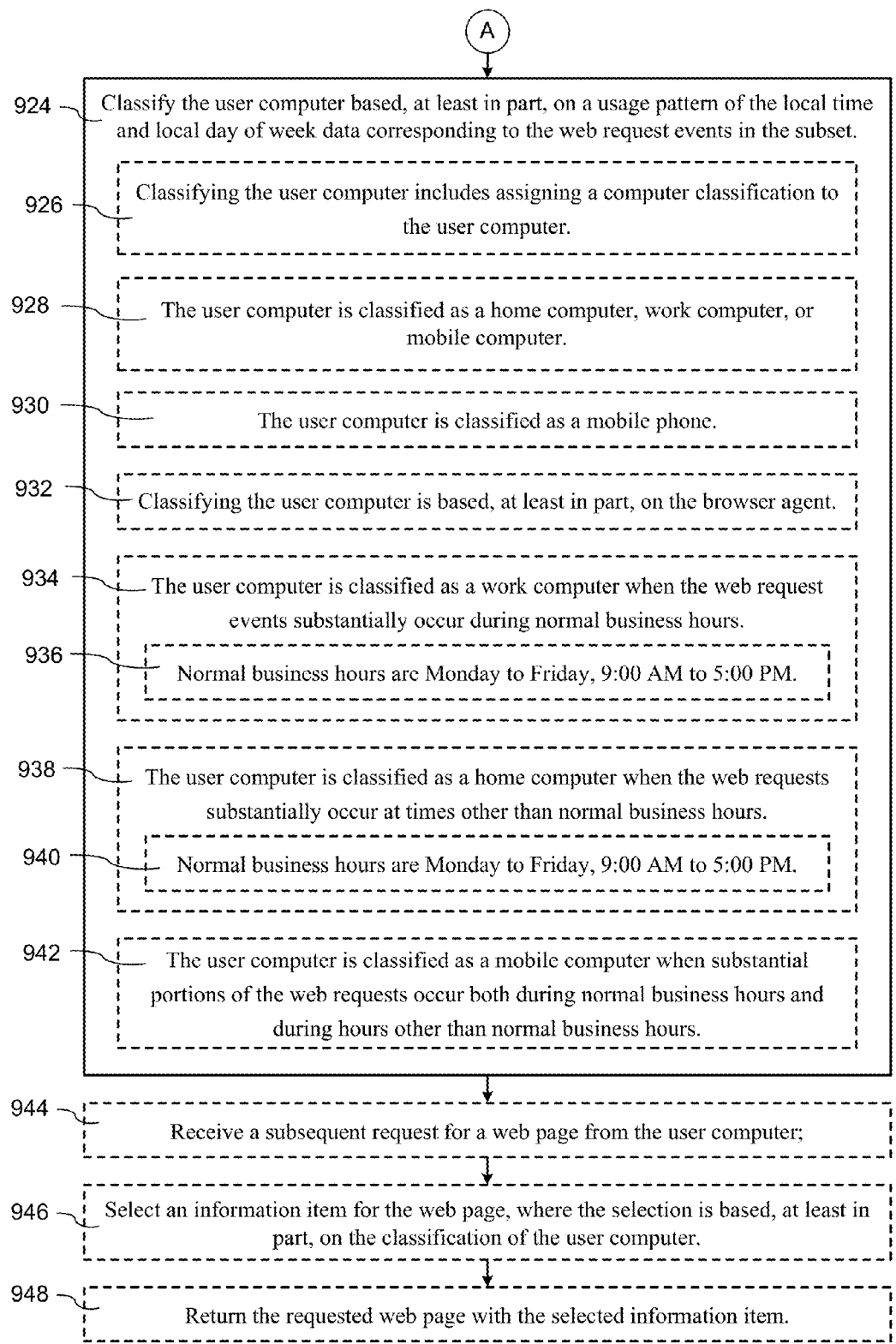

FIGS. 9A and 9B illustrate an exemplary process flow according to some embodiments. The method 900 classifies (902) a user computer without explicit input from a user. Rather than directly asking the user to classify the computer, the method 900 here classifies the computer indirectly based on an assessment of the user's web activity. This indirect methodology has several beneficial aspects. First, the determination is made without placing a burden on a user or interrupting a user's normal tasks. Second, because the classification is based on actual usage, it is less subject to incorrect classification by the user. As illustrated in more detail below, some embodiments classify the computer based on when a user is accessing the computer. Both the time of day and the day of the week provide information about where the computer is being used. In other embodiments, the classification is based on other information, such as the websites accessed by the user.

When a user issues a web request, the web requests are logged, either at the web server 400 processing the request, or a separate log server 300, or both. In the embodiment illustrated in FIGS. 9A and 9B, the log server 300 receives (904) a plurality of web request events corresponding to web requests issued by users. A web request is the actual request issued by a user, such as an HTTP request for a web page or a search query. A web request event comprises information about a web request. Each web request event 322 includes (906) a cookie 324 that identifies the user computer that originated the corresponding web request. The cookie 324 is referred to herein as a classification cookie because it is used in the classification process 900. The classification cookie 324 uniquely identifies the computer that originated the request, using a unique identifier, such as a MAC address. In some embodiments, the unique computer identifier is generated by the log server 300 (or other central server). The classification cookie 324 is reused for multiple web requests, allowing the log server to correlate multiple requests from the same user computer.

Each web request event 322 also includes (908) the IP address 326 corresponding to the user computer at the time the web request was issued. Note that the IP address 326 is generally not the IP address assigned to the user computer because web requests are generally sent over an internal network before being routed over the Internet. IP addresses from the internal network provide no information about the geographic location of a computer because the same internal IP addresses can be used everywhere. For example, many computers throughout the world are assigned an IP address of 192.168.1.5. Therefore, the relevant IP address 326 is the external IP address of the router that handles web traffic from the user computer. Because the IP address 326 is the one generally associated with a router or modem that connects to the Internet, the same IP address generally applies to the web request events 322 from multiple user computers. This is okay here because the IP address 326 will be used to establish a geographic location, not to uniquely identify the user computer 200. The classification cookie 324 uniquely identifies the user computer 200.

The IP address 326 corresponding to a user computer is subject to change, and thus an IP address is associated with each transaction. As noted above, the relevant IP address 326 is the IP address of the router or modem that connects the user computer to the Internet, and does not change frequently. However, a new IP address for the modem or router may be assigned when the modem or router is rebooted.

Each web request event 322 includes (910) a date/time stamp 328 indicating when the corresponding web request event was received at the web server. In this embodiment, the data/time at the web server 400 is effectively a surrogate for the date/time the request was issued at the user computer. Since there is very little delay between sending the request and receiving the request at the web server 400, the two date/time stamps are effectively. Although some embodiments use the date/time from the user computer, the clock on the user computer is both unreliable and potentially inconsistent with the actual time. For example, a user computer originally configured to be on Pacific Time may be physically located in a different time zone, such as Eastern Time. In other embodiments, the date/time stamp 328 is the date/time that the web request event is received at the log server 300. These embodiments have the advantage that only the clock on the log server 300 is required to be accurate, instead of the clocks on a potentially large number of web servers 400. As long as the web request events 322 are forwarded directly to the log server, the time at the log server 300 reflects when the web request was issued.

In some embodiments, each web request event 322 includes (912) information identifying the browser agent 330 corresponding to the user computer 200. The browser agent 330 identifies the web browser that issued the web request, and generally includes the version number of the web browser as well.

The log server 300 stores (914) the web request events 322 in a web access log 320. After collecting and storing web request events 322, the log server 300 begins a series of operations to classify user computers corresponding to the web request events. The web server 300 selects (916) a subset of the stored web request events 322 that are all associated with a single classification cookie 324. Because the classification cookie uniquely identifies a user computer, all of the web request events in the subset are associated with a single user computer 200.

For each (918) web request event 322 in the subset, the log server 300 computes (920) a geographical location corresponding to the user computer 200 using the IP address 326. In some embodiments, the computation uses a lookup table or dictionary that associates ranges of IP address with geographical locations. One objective is to establish the time zone that is applicable to the location of the user computer, and thus a precise location is not required. E.g., for locations in the United States, it is typically enough to know the city and state where IP addresses are assigned.

For each (918) web request event 322 in the subset, the log server 300 uses the stored date/time 328 and the computed geographic location of the user computer 200 to determine (922) the local time and day of week corresponding to the web request. Because the time zone of the web server 400 (or log server 300) are known, and the time zone of the user computer 200 are known from the computed geographic location, the offset between the two time zones is determined. This offset (which can be negative) is added to the date/time stamp 328 to determine the local date and time that the web request was issued. Using a calendar, the local date corresponds to a unique day of the week.

In some embodiments, an additional originating date/time stamp 332 is also collected and stored (914). This alternate date/time stamp 332 identifies the date/time of the user computer 200 when the web request was issued. Although this alternate date/time stamp 332 may be less reliable than the determination (922) described above, it can be used when the IP address 326 is insufficient to determine the geographic location of the user computer 200.

The log server 300 then classifies (924) the user computer 200 based, at least in part, on a usage pattern of the of the local time and local day of week data corresponding to the web request events 322 in the subset. In some embodiments, classifying the computer includes assigning (926) a computer classification to the user computer 200. For example, the user computer 200 may be classified (928) as a home computer, work computer, or mobile computer. In some embodiments, the user computer 200 is classified (934) as a work computer when the web request events substantially occur during normal business hours. For example, normal business hours may be (936) 9:00 AM to 5:00 PM, Monday through Friday. In some embodiments, the user computer 200 is classified (938) as a home computer when the web requests substantially occur at times other than normal business hours. As noted above, normal business hours are (940) Monday to Friday, 9:00 AM to 5:00 PM in some embodiments. In some embodiments, normal business hours are defined regionally. Normal business hours are different for different countries, and normal business hours even varies within countries. For example, in California a normal work week is 40 hours, whereas many places on the east coast of the United States have a 37.5 hour standard work week. In some embodiments, a user computer 200 is classified (942) as a mobile computer when substantial portions of the web requests occur both during normal business hours and during hours other than normal business hours. For example, a user may have a laptop computer that is used both at the office and at home. In some embodiments, a classification label other than "mobile computer" is used to classify computers that are used both at home and for work. For example, a person who works at home may have a single computer that is used both for work and for personal activities. Because such a "mixed-use" computer need not be mobile, some embodiments refer to these computers as "mixed-use."

In some embodiments, the log server 300 classifies (932) the user computer 200 based, at least in part, on the browser agent 330 associated with the user computer 200. Because many smart phone devices have much of the functionality of a desktop or laptop computer, such phones are included in set of devices considered as a "user computer" 200. In fact, any electronic device that has a web browser and the ability to connect to the Internet is considered a user computer 200. The browser agent 330 identifies the web browser that is running on the device 200, and generally identifies the browser version as well. In some embodiments, the log server 300 classifies (930) the user computer 200 as a mobile phone. The classification of a user computer 200 as a mobile phone uses the browser agent information 330 in some embodiments.

In some embodiments, a web server 400 receives (944) a subsequent request for a web page from the user computer 200. The web server 200 selects (946) an information item for the web page, where the selection is based, at least in part, on the classification of the user computer 200. An information item can be an advertisement, a search result, a press release or other news announcement, or any other content for the web page that is dynamically generated at run time. The web server 200 then returns (948) the web page with the selected information item. In some embodiments, the selection of the information item is performed by the log server 400, or another server (not depicted in FIG. 1).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of indirectly classifying a user computer, comprising:
   receiving at a server computer system a plurality of web request events corresponding to web requests issued by users, wherein each respective web request event of the plurality of web request events includes:
   i) a cookie that identifies a user computer that originated the corresponding respective web request;
   ii) an IP address corresponding to the user computer at the time the corresponding respective web request was issued; and
   iii) a date/time stamp indicating when the corresponding respective web request was received at a web server;
   storing the plurality of web request events;
   selecting a subset of the plurality of web request events, wherein each web request event in the subset is associated with a single first cookie;
   for each respective selected web request event in the subset:
      computing a respective geographical location corresponding to the user computer using the IP address associated with the respective selected web request event; and
      determining a local time and local day of week corresponding to the respective selected web request event using a stored date/time stamp of the corresponding respective web request and the computed respective geographic location; and
   classifying the user computer as a type including home computer, work computer, or mobile computer, wherein the classification is based, at least in part, on a usage pattern of the user computer, and wherein the usage pattern includes the local time and local day of week data corresponding to the web request events in the subset.

2. The method of claim 1, wherein classifying the user computer comprises assigning a computer classification to the user computer.

3. The method of claim 1, wherein the user computer is classified as a home computer, work computer, or mobile computer.

4. The method of claim 1, wherein the user computer is classified as a mobile phone.

5. The method of claim 1, wherein each web request event further includes information identifying a browser agent corresponding to the user computer.

6. The method of claim 5, wherein classifying the user computer is further based, at least in part, on the browser agent.

7. The method of claim 1, wherein the user computer is classified as a work computer when the web request events substantially occur during normal business hours.

8. The method of claim 7, wherein normal business hours are Monday through Friday, 9:00 AM to 5:00 PM.

9. The method of claim 1, wherein the user computer is classified as a home computer when the web requests substantially occur at times other than normal business hours.

10. The method of claim 9, wherein normal business hours are Monday through Friday, 9:00 AM to 5:00 PM.

11. The method of claim 1, wherein the user computer is classified as a mobile computer when a substantial portion of the web requests occur during normal business hours and a substantial portion of the web requests occur during hours other than normal business hours.

12. The method of claim 1, further comprising:
   receiving a subsequent request for a web page from the user computer;
   selecting an information item for the web page, wherein the selection is based, at least in part, on the classification of the user computer; and
   returning the requested web page with the selected information item.

13. A server computer system for indirectly classifying a user computer, comprising:
   memory;
   one or more processors; and
   one or more programs stored in the memory and configured for execution by the one or more processors, the one or more programs including:
      instructions for receiving at the server computer system a plurality of web request events corresponding to web requests issued by users, wherein each respective web request event in the plurality of web request events includes:
         i) a cookie that identifies a user computer that originated the corresponding respective web request;
         ii) an IP address corresponding to the user computer at the time the corresponding respective web request was issued; and
         iii) a date/time stamp indicating when the corresponding respective web request was received at a web server;

instructions for storing the plurality of web request events;

instructions for selecting a subset of the plurality of web request events, wherein each web request event in the subset is associated with a single first cookie;

instructions for processing each respective selected web request event in the subset, including:

instructions for computing a respective geographical location corresponding to the user computer using the IP address associated with the respective selected web request event; and instructions for determining a local time and local day of week corresponding to the respective selected web request event using a stored date/time stamp of the corresponding respective web request and the computed respective geographic location; and instructions for classifying the user computer as a type including home computer, work computer, or mobile computer, wherein the classification is based, at least in part, on a usage pattern of the user computer, and wherein the usage pattern includes the local time and local day of week data corresponding to the web request events in the subset.

14. The server computer system of claim 13, wherein the instructions for classifying the user computer include instructions for assigning a computer classification to the user computer.

15. The server computer system of claim 13, wherein the user computer is classified as a home computer, work computer, or mobile computer.

16. The server computer system of claim 13, wherein the user computer is classified as a mobile phone.

17. The server computer system of claim 13, wherein each web request event further includes information identifying a browser agent corresponding to the user computer.

18. The server computer system of claim 17, wherein the instructions for classifying the user computer further include instructions to perform the classification based, at least in part, on the browser agent.

19. The server computer system of claim 13, wherein the instructions for classifying a user computer include instructions for classifying the user computer as a work computer when the web request events substantially occur during normal business hours.

20. The server computer system of claim 19, wherein normal business hours are Monday through Friday, 9:00 AM to 5:00 PM.

21. The server computer system of claim 13, wherein the instructions for classifying a user computer include instructions for classifying the user computer as a home computer when the web requests substantially occur at times other than normal business hours.

22. The server computer system of claim 21, wherein normal business hours are Monday through Friday, 9:00 AM to 5:00 PM.

23. The server computer system of claim 13, wherein the instructions for classifying a user computer include instructions for classifying the user computer as a mobile computer when a substantial portion of the web requests occur during normal business hours and a substantial portion of the web requests occur during hours other than normal business hours.

24. The server computer system of claim 13, further comprising:

instructions for receiving a subsequent request for a web page from the user computer;

instructions for selecting an information item for the web page, wherein the selection is based, at least in part, on the classification of the user computer; and instructions for returning the requested web page with the selected information item.

25. A non-transitory computer readable storage medium storing one or more programs to be executed by a server computer system, the one or more programs comprising:

instructions for receiving at the server computer system a plurality of web request events corresponding to web requests issued by users, wherein each respective web request event in the plurality of web request events includes:

i) a cookie that identifies a user computer that originated the corresponding respective web request;

ii) an IP address corresponding to the user computer at the time the corresponding respective web request was issued; and iii) a date/time stamp indicating when the corresponding respective web request was received at a web server;

instructions for storing the plurality of web request events;

instructions for selecting a subset of the plurality of web request events, wherein each web request event in the subset is associated with a single first cookie;

instructions for processing each respective selected web request event in the subset, including:

instructions for computing a respective geographical location corresponding to the user computer using the IP address associated with the respective selected web request event; and instructions for determining a local time and local day of week corresponding to the respective selected web request event using a stored date/time stamp of the corresponding respective web request and the computed respective geographic location; and instructions for classifying the user computer as a type including home computer, work computer, or mobile computer, wherein the classification is based, at least in part, on a usage pattern of the user computer, and wherein the usage pattern includes the local time and local day of week data corresponding to the web request events in the subset.

* * * * *